(12) United States Patent
Okada

(10) Patent No.: US 11,697,916 B2
(45) Date of Patent: Jul. 11, 2023

(54) EXCAVATOR AND METHOD OF CONTROLLING THE SAME

(71) Applicant: SUMITOMO HEAVY INDUSTRIES, LTD., Tokyo (JP)

(72) Inventor: Junichi Okada, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 185 days.

(21) Appl. No.: 17/093,648

(22) Filed: Nov. 10, 2020

(65) Prior Publication Data

US 2021/0054593 A1 Feb. 25, 2021

Related U.S. Application Data

(60) Division of application No. 16/010,514, filed on Jun. 17, 2018, now Pat. No. 10,858,800, which is a
(Continued)

(30) Foreign Application Priority Data

Dec. 18, 2015 (JP) .............................. JP2015-247017

(51) Int. Cl.
| | |
|---|---|
| *E02F 3/43* | (2006.01) |
| *E02F 3/30* | (2006.01) |
| *B60K 28/16* | (2006.01) |
| *E02F 9/20* | (2006.01) |
| *E02F 3/32* | (2006.01) |

(Continued)

(52) U.S. Cl.
CPC .............. *E02F 3/435* (2013.01); *B60K 28/16* (2013.01); *E02F 3/308* (2013.01); *E02F 3/32* (2013.01); *E02F 3/425* (2013.01); *E02F 9/2004* (2013.01); *E02F 9/2079* (2013.01); *E02F 9/2221* (2013.01); *E02F 9/2246* (2013.01); *E02F 9/2253* (2013.01); *E02F 9/2285* (2013.01); *E02F 9/2292* (2013.01)

(58) Field of Classification Search
CPC ... B60K 28/16; B60W 10/30; B60W 2520/26; B60W 2540/00; B60W 2710/30; B60W 30/02; B60W 30/18172; E02F 3/308; E02F 3/32; E02F 3/425; E02F 3/435; E02F 9/2004; E02F 9/2079; E02F 9/2221; E02F 9/2246; E02F 9/2253; E02F 9/2285; E02F 9/2292
See application file for complete search history.

(56) References Cited

U.S. PATENT DOCUMENTS

| | | | |
|---|---|---|---|
| 8,768,580 B2 | 7/2014 | Mizuochi et al. | |
| 9,127,434 B2 | 9/2015 | Shiratani et al. | |
| 2002/0070056 A1* | 6/2002 | Wilcox ................ | B62D 11/183 180/6.7 |

FOREIGN PATENT DOCUMENTS

| | | |
|---|---|---|
| JP | WO2011/049079 A1 | 4/2011 |
| JP | 2014-163155 A | 9/2014 |
| JP | 2015-064024 A | 4/2015 |

* cited by examiner

*Primary Examiner* — Tyler J Lee
(74) *Attorney, Agent, or Firm* — HEA Law PLLC

(57) ABSTRACT

An attachment is attached to an upper turning body. During a normal operation, a drive means drives the attachment according to an input of an operator to a manipulation device. A sensor detects a motion of an excavator. Based on an output of the sensor, the slip suppression unit detects slip of a traveling body in an extension direction of the attachment and corrects an operation of the attachment performed by the drive means.

6 Claims, 13 Drawing Sheets

Related U.S. Application Data continuation of application No. PCT/JP2016/079835, filed on Oct. 6, 2016.

(51) Int. Cl.
*E02F 9/22* (2006.01)
*E02F 3/42* (2006.01)

EXCAVATOR AND METHOD OF CONTROLLING THE SAME

RELATED APPLICATIONS

This application claims priority to and is a Division of U.S. application Ser. No. 16/010,514 filed on Jun. 17, 2018 which is a National Stage of International Application No. PCT/JP2016/079835 filed on Oct. 6, 2016, which claims priority to Japanese Patent Application No. 2015-247017 filed on Dec. 18, 2015, the content of which is hereby incorporated by reference into this application.

BACKGROUND

Technical Field

Certain embodiment of the present invention relates to an excavator.

Description of Related Art

An excavator mainly includes a traveling body (also referred to a crawler or a lower), an upper turning body, and an attachment. The upper turning body is rotatably attached to the traveling body and a position of the upper turning body is controlled by a turning motor. The attachment is attached to upper turning body and is used during an operation.

In a case where the excavator is used in a brittle field having a low elastic modulus such as soft soil, or in case where the excavator is used in a field having a low friction coefficient, there is a problem that the excavator slips. For example, in the related art, a technique relating to slip prevention of a traveling body during traveling is disclosed. For example, in the related art, a technique relating to slip prevention of a traveling body during turning is disclosed.

SUMMARY

According to an embodiment of the present invention, there is provided an excavator including: a traveling body; an upper turning body which is rotatably provided on the traveling body; an attachment which is attached to the upper turning body; a sensor which detects a motion of the excavator; and a slip suppression unit which, based on an output of the sensor, detects slip of the traveling body in an extension direction of the attachment and corrects an operation of the attachment.

According to another embodiment of the present invention, there is provided a method of controlling an excavator having an attachment, the method including: a step of detecting acceleration of a motion of the excavator in an extension direction of the attachment by a sensor during an operation of the attachment; and a step of correcting the operation of the attachment if the acceleration exceeds a predetermined threshold.

According to still another embodiment of the present invention, there is provided an excavator, including: a traveling body; an upper turning body which is rotatably provided on the traveling body; an attachment which is attached to the upper turning body; and a control device which corrects an operation of the attachment if a position of the traveling body is displaced during an excavation work performed by the attachment.

DETAILED DESCRIPTION

Figure 1:
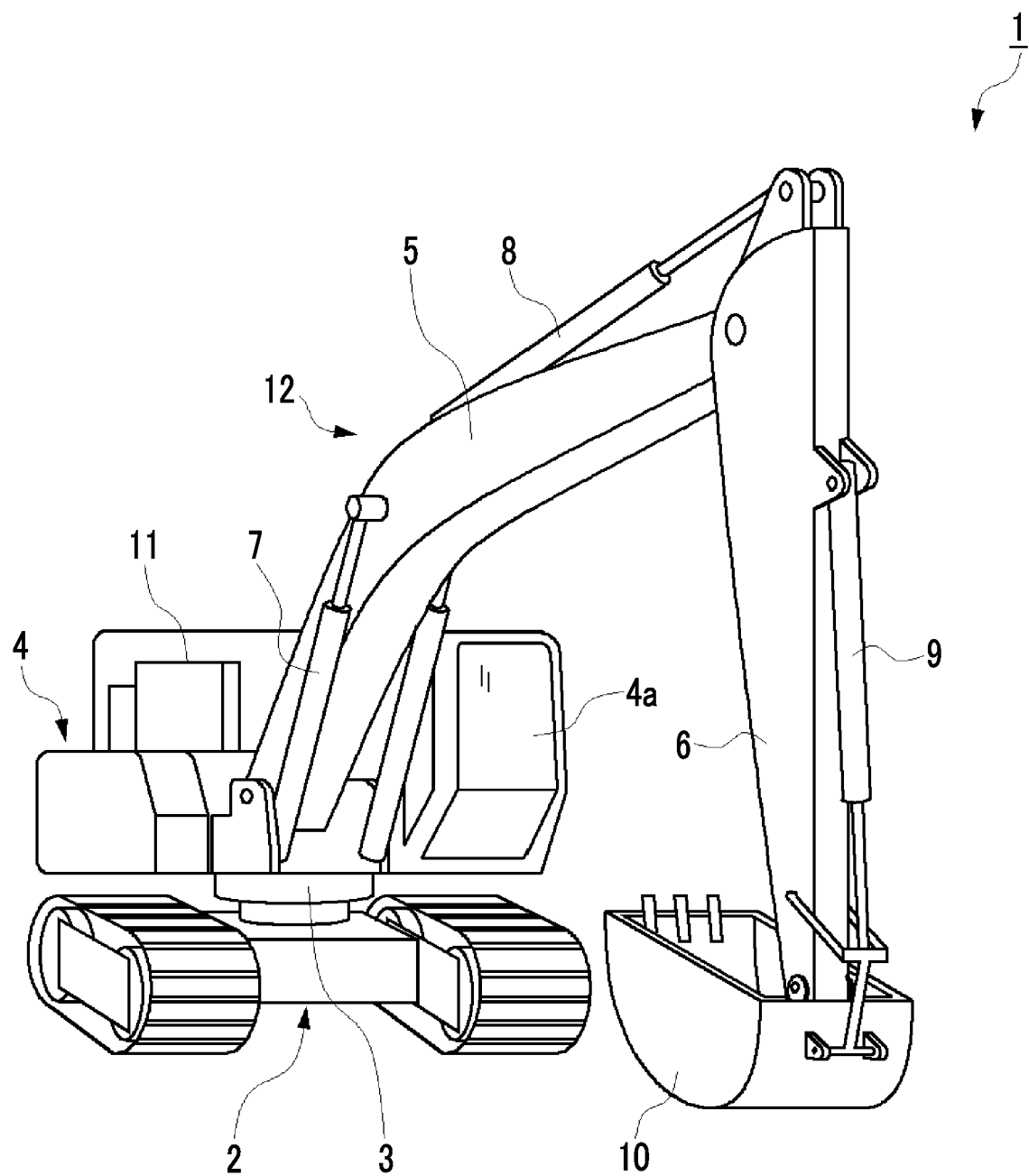
FIG. 1 is a perspective view showing an appearance of an excavator which is an example of a construction machine according to an embodiment.

As a result of considering an excavator, the present inventors have recognized the following problems. During a work using an attachment such as excavation, crushing, or leveling, a traveling body receives a reaction force from the attachment. If the reaction force increases, there is a concern that the traveling body may slip. In the related art, if the traveling body slips during the work, an operator who perceived the slip needs to stop an operation of the attachment, which causes a problem of reduction in work efficiency. Alternatively, the operator needs to finely adjust the operation of the attachment so as not to cause the slip based on experience. However, if slip prevention is left to the operator's manipulation, there is a possibility that an immature operator may cause the traveling body to slip.

In the related art, the slip prevention is intended for turning and running, and no attention is given to the operation of the attachment.

It is desirable to provide an excavator having a mechanism for suppressing slip caused by an operation of an attachment.

A boom, an arm, and a bucket of the attachment are positioned in the same plane, and thus, during the operation of the attachment, a reaction force from attachment acts in the extension direction of the attachment with respect to a body (the traveling body and the upper turning body) of the excavator. In other words, when the slip in this direction occurs, it is assumed that the slip is caused by the operation of the attachment. According to this aspect, the slip caused by the operation of the attachment is detected, and it is possible to suppress the slip by correcting the operation of the attachment according to a result of the detection.

In a case where the slip is indirectly detected based on pressure detection information of a cylinder of the attachment, delay occurs. Meanwhile, by directly detecting the slip of the body of the excavator using sensor, the detection delay can be shortened and a quick response can be performed.

The sensor may include an acceleration sensor which is provided in the upper turning body and has a detection shaft in the extension direction of the attachment. In this case, it is possible to directly detect the motion of the attachment in the extension direction regardless of a turning direction (position) of the upper turning body.

The acceleration sensor may be disposed in a region between a root of a boom of the attachment and a turning axis of the upper turning body. Here, an application point of a force which is exerted to the upper turning body by the attachment is the root of the boom. Therefore, it is possible to appropriately detect the slip caused by the operation of the attachment by providing the acceleration sensor in the root of the boom. Here, if the acceleration sensor is away from the turning axis, the output of the acceleration sensor is affected by a centrifugal force caused by a turning motion of the upper turning body. Accordingly, it is possible to decrease influences of the turning motion and detect the slip caused by the operation of the attachment by disposing the acceleration sensor in the vicinity of the root of the boom and in the vicinity of the turning axis.

The sensor may further include an angular speed sensor which detects an angular speed. The slip suppression unit may detect the slip of the traveling body, based on an output of the acceleration sensor and an output of the angular speed sensor. The output of the acceleration sensor may include components of rotary motions in a pitching direction, a yawing direction, and a rolling direction as well as slip (rectilinear motion) in a specific direction. According to this aspect, by using the angular speed sensor in combination, it is possible to extract only the slip motion.

If the acceleration exceeds a predetermined threshold, the slip suppression unit corrects the operation of the attachment. Accordingly, when the slip does not occur, the attachment is normally operated based on an input of the operator, and the correction can be performed only when the slip occurs.

The slip suppression unit may decrease a torque (force) of at least one shaft of the attachment. If the force generated in the attachment decreases, a force F acting on the traveling body in the extension direction of the attachment decreases, and the slip decreases. If the slip decreases, even when the force of the attachment returns to an original force, the slip does not occur if the force does not exceed the maximum static friction force. Accordingly, by performing the decrease of the torque at a short time scale, it is possible to suppress the slip without impairing discomfort or stress to the operator.

The at least one shaft may include an arm shaft. As a result of examination by the present inventors, a knowledge that a main cause of the slip caused by the operation of the attachment is an operation of the arm is obtained. Therefore, it is possible to appropriately suppress the slip by decreasing the torque (force) of the arm shaft.

The slip suppression unit may relieve a cylinder pressure of the at least one shaft. Accordingly, it is possible to decrease the torque (force) generated in the shaft.

The slip suppression unit may change a control pressure of the at least one shaft to a cylinder. Accordingly, it is possible to decrease the torque (force) generated in the shaft.

The slip suppression unit may decrease an output of a main pump of a hydraulic system. The slip suppression unit may decrease a rotation speed of an engine. Accordingly, it is possible to uniformly decrease the torques of all shafts.

The slip suppression unit may displace at least one shaft of the attachment. Accordingly, it possible to change the direction of the force (vector) generated by the attachment by changing a posture of the attachment, and it is possible to decrease the force in the direction in which the traveling body slips and/or to increase a vertical drag by pressing the traveling body to the ground.

If slip is detected, the slip suppression unit performs correction during a predetermined correction period, and thereafter, returns a state based on an input of an operator. The correction period may be a time scale of several ms to several hundred ms.

The sensor may be an image sensor. The slip suppression unit may detect slip of the traveling body in the extension direction of the attachment, based on an output of the image sensor.

In addition, aspects of the present invention include any combination of the above-described elements and mutual substitution of elements or expressions of the present invention among methods, apparatuses, systems, or the like.

Advantageous Effects of Invention

According to the present invention, it is possible to suppress slip of a traveling body of an excavator.

Brief Description of Drawings

Hereinafter, preferred embodiments of the present invention will be described with reference to the drawings. Identical or equivalent constituent elements, members, and processes shown in the drawings are denoted by the same reference numerals and overlapping descriptions thereof will be appropriately omitted. In addition, the embodiment is not limited to the invention but is an example, and all the features and combinations thereof described in the embodiments are not necessarily essential to the invention.

In the present specification, "a state in which a member A and a member B are connected to each other" includes not only a case where the member A and the member B are physically connected to each other directly but also a case where the member A and the member B are indirectly connected to each other via other members which do not substantially affect an electric connection state or do not impair functions or effects exerted by the connection.

FIG. 1 is a perspective view showing an appearance of an excavator 1 which is an example of a construction machine according to an embodiment. The excavator 1 mainly includes a traveling body (also referred to a lower or a crawler) 2 and a turning body 4 which is rotatably mounted on an upper portion of the traveling body 2 via a turning device 3.

An attachment 12 is attached to the upper turning body 4. A boom 5, an arm 6 which is link-connected to a tip of the boom 5, a bucket 10 which is link-connected to a tip of the arm 6 are attached to the attachment 12. The bucket 10 is a device for capturing suspended loads such as earth and sand and steel materials. The boom 5, the arm 6, and the bucket 10 are respectively driven hydraulically by a boom cylinder 7, an arm cylinder 8, and a bucket cylinder 9. In addition, in the upper turning body 4, a cab 4a in which an operator (driver) who manipulates a position of the bucket 10, an excitation operation, and a releasing operation is accommodated or a power source such as an engine 11 for generating a hydraulic pressure are provided. For example, the engine 11 is configured of a diesel engine.

Figure 2:
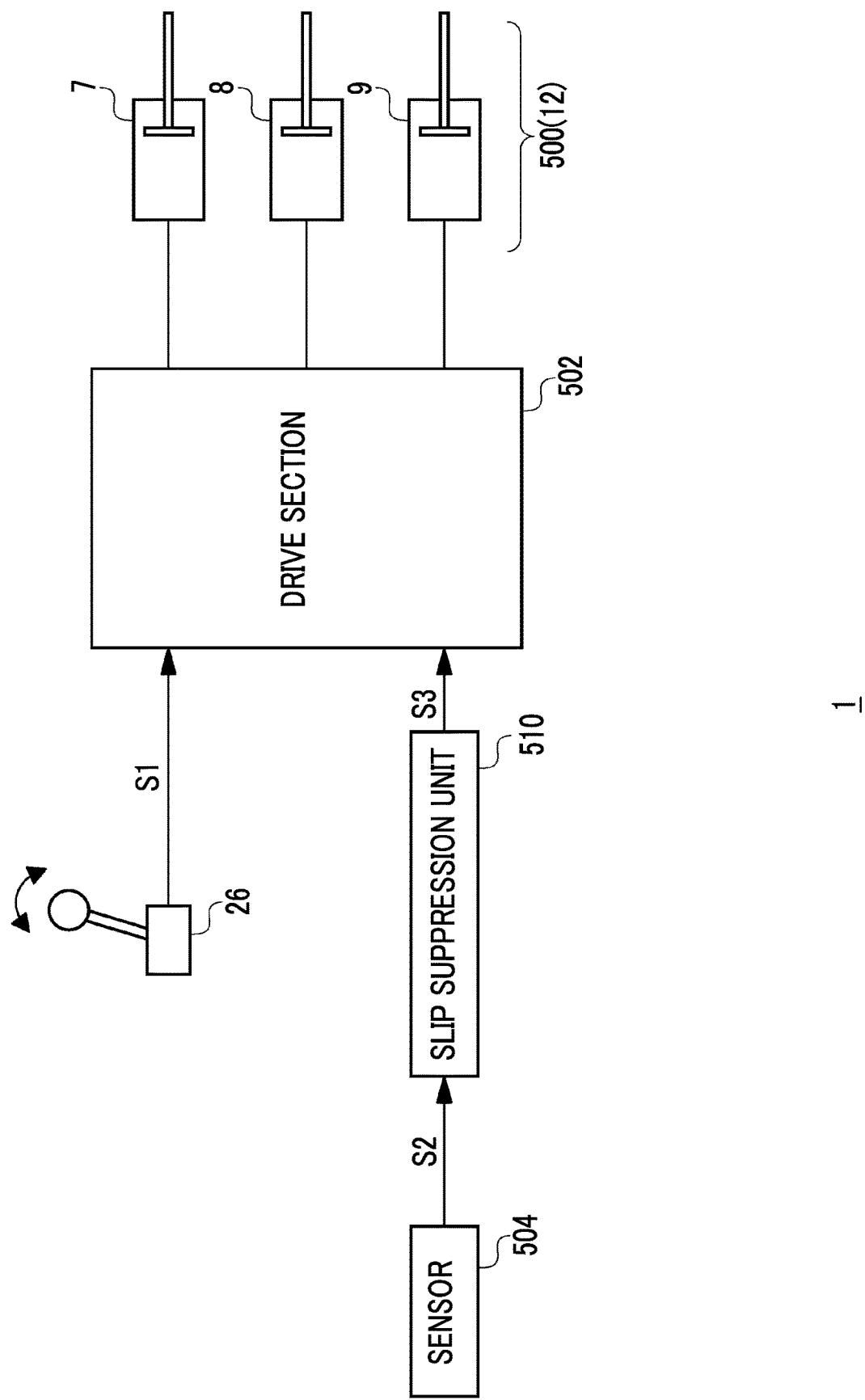
FIG. 2 is a control block diagram of an attachment of the excavator according to the embodiment.

FIG. 2 is a control block diagram of the attachment 12 of the excavator 1 according to the embodiment. The excavator 1 includes a hydraulic actuator 500, drive means 502, a sensor 504, and a slip suppression unit 510. A function of each block is realized electrically or mechanically, or by a combination thereof, and a method of realizing a configuration and the function of each block is not limited.

The hydraulic actuator 500 is an actuator which drives the attachment 12 in FIG. 1 and, specifically, includes the boom cylinder 7, the arm cylinder 8, and the bucket cylinder 9. Actually, the controls of the boom cylinder 7, the arm cylinder 8, and the bucket cylinder 9 are performed independently. However, here, for simplification, the controls are shown as one control system. A manipulation device 26 receives a manipulation input from the operator and generates a command value S1 for the hydraulic actuator 500. Actually, the command value S1 is individually generated for a boom shaft, an arm shaft, and a bucket shaft. However, here, the command value S1 shown as one signal line. The drive means 502 drives the hydraulic actuator 500 based on the command value S1.

The sensor 504 detects the motion of a body of the excavator 1. A type or a configuration of the sensor 504 is not particularly limited as long as it can detect the slip of the traveling body 2 of the excavator 1. In addition, the sensor 504 may be a combination of a plurality of sensors. Preferably, the sensor 504 may include an acceleration sensor and a speed sensor provided in the upper turning body 4. It is preferable that a direction of a detection shaft of the acceleration sensor or the speed sensor coincides with an extension direction of the attachment 12 (a direction L1 in FIGS. 3A and 3B).

Based on an output S2 of the sensor 504, the slip suppression unit 510 detects the slip of the traveling body 2 in the extension direction of the attachment 12, generates a correction command S3 such that the slip is suppressed, and based on the correction command S3, corrects the control of the hydraulic actuator 502 by the drive means 500, and thus, corrects the operation of the attachment 12. Moreover, the output S2 of the sensor 504 may include a component caused by a vibration, a component caused by turning, a component caused by disturbance, or the like, in addition to a component caused by the slip. The slip suppression unit 510 may include a filter which extracts only a dominant frequency component in a slip motion from the output S2 of the sensor 504 and removes other frequency components.

Figure 3A:
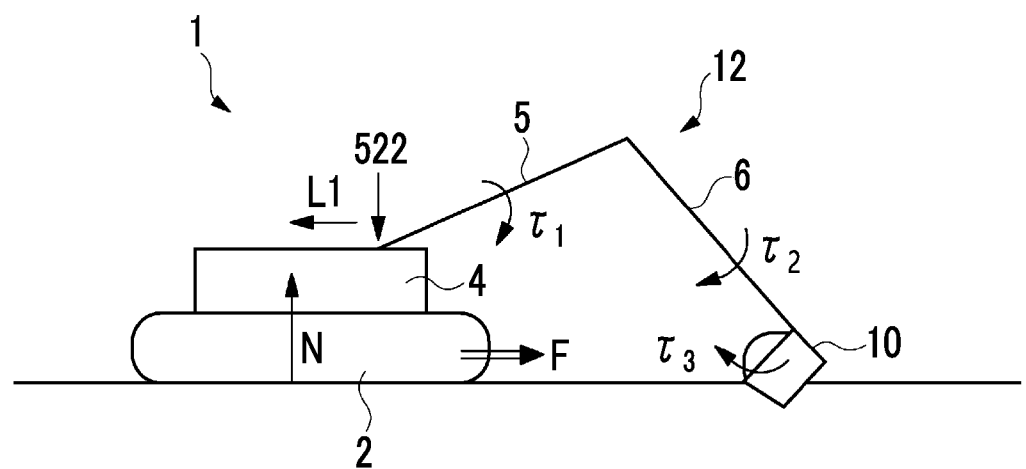
FIGS. 3A and 3B are diagrams explaining slip of the excavator caused by an operation of the attachment.
Figure 3B:
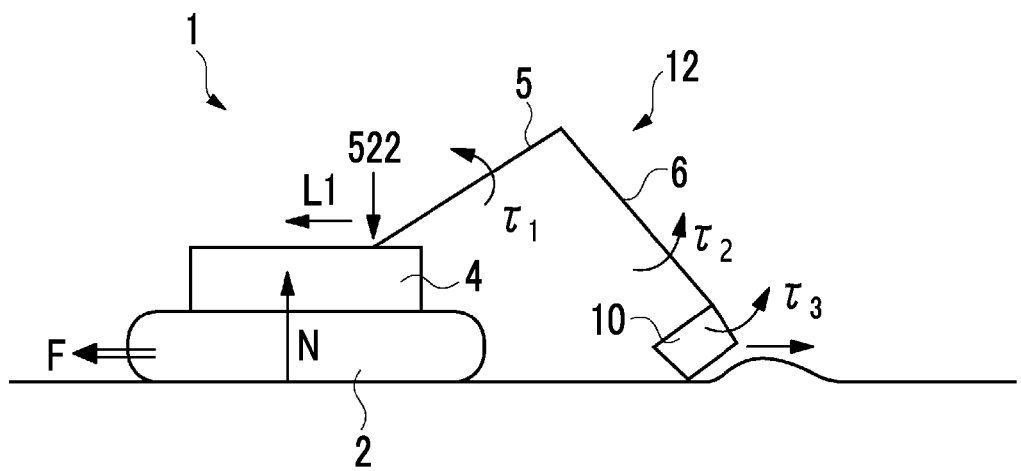
Figure 4A:
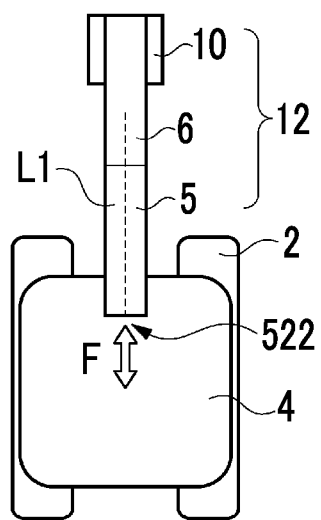
FIGS. 4A and 4D are diagrams explaining the slip of the excavator.
Figure 4B:
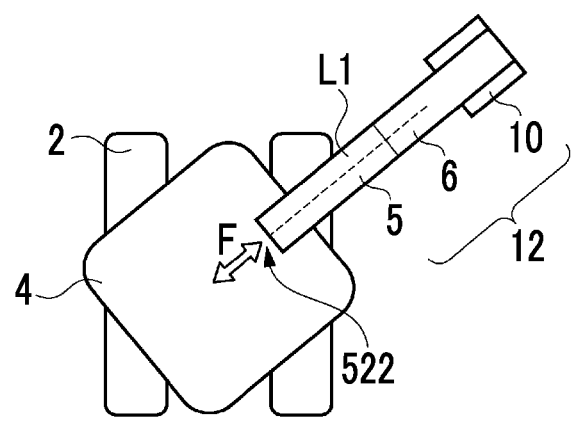
Figure 4C:
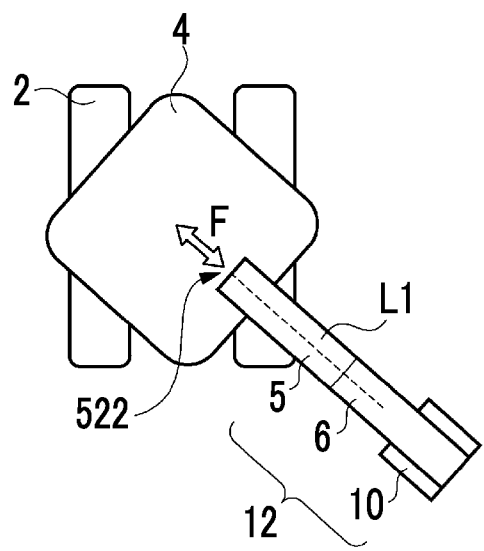
Figure 4D:
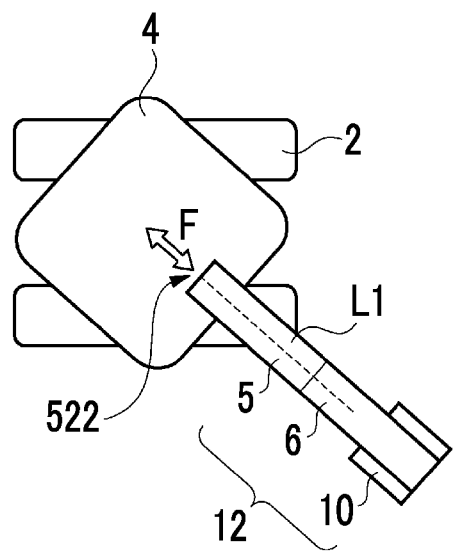

Hereinbefore the basic configuration of the excavator 1 is described. Continuously, the operation of the excavator 1 will be described. FIGS. 3A and 3B are diagrams explaining the slip of the excavator 1 caused by the operation of the attachment 12. FIGS. 3A and 3B are diagrams of the excavator 1 when is viewed from the side. τ1 to τ3 indicate torques (forces) generated in the respective links of the boom 5, the arm 6, and the bucket 10. FIG. 3A shows an excavation work, a force F which is exerted to the body (the traveling body 2 and the upper turning body 4) of excavator 1 by the attachment 12 acts on a root 522 of the boom 5, and this force F acts in a direction in which the traveling body 2 is close to the bucket 10. If a static friction coefficient between the traveling body 2 and a ground is defined as μ and a vertical drag with respect to the traveling body 2 is defined as N, when F>μN is satisfied, the traveling body 2 starts to slip in the direction of the force F.

FIG. 3B shows a leveling work, the force F which is exerted to the body of excavator 1 by the attachment 12 acts in a direction in which the traveling body 2 is away from the bucket 10. In this case, when F>μN is satisfied, the traveling body 2 starts to slip in the direction of the force F.

FIGS. 4A, 4B, 4C and 4D are diagrams explaining the slip of the excavator 1. FIGS. 4A, 4B, 4C and 4D are diagrams of the excavator 1 when viewed from directly above. The boom 5, the arm 6, the bucket 10 of the attachment 12 are always positioned in the same plane (sagittal plane) regardless of their postures and work contents. Therefore, during the operation of the attachment 12, it can be said that the reaction force F from attachment 12 acts in the extension direction L1 of the attachment with respect to the body (the traveling body 2 and the upper turning body 4) of the excavator 1. This does not depend on a positional relationship (rotation angle) between the traveling body 2 and the upper turning body 4. As shown in FIGS. 3A and 3B, the direction of the force F varies depending on the work contents. In other words, when the slip in the extension direction L1 occurs, it is assumed that the slip is caused by the operation of the attachment 12, and thus, the slip can be suppressed by controlling the attachment 12.

Figure 5:
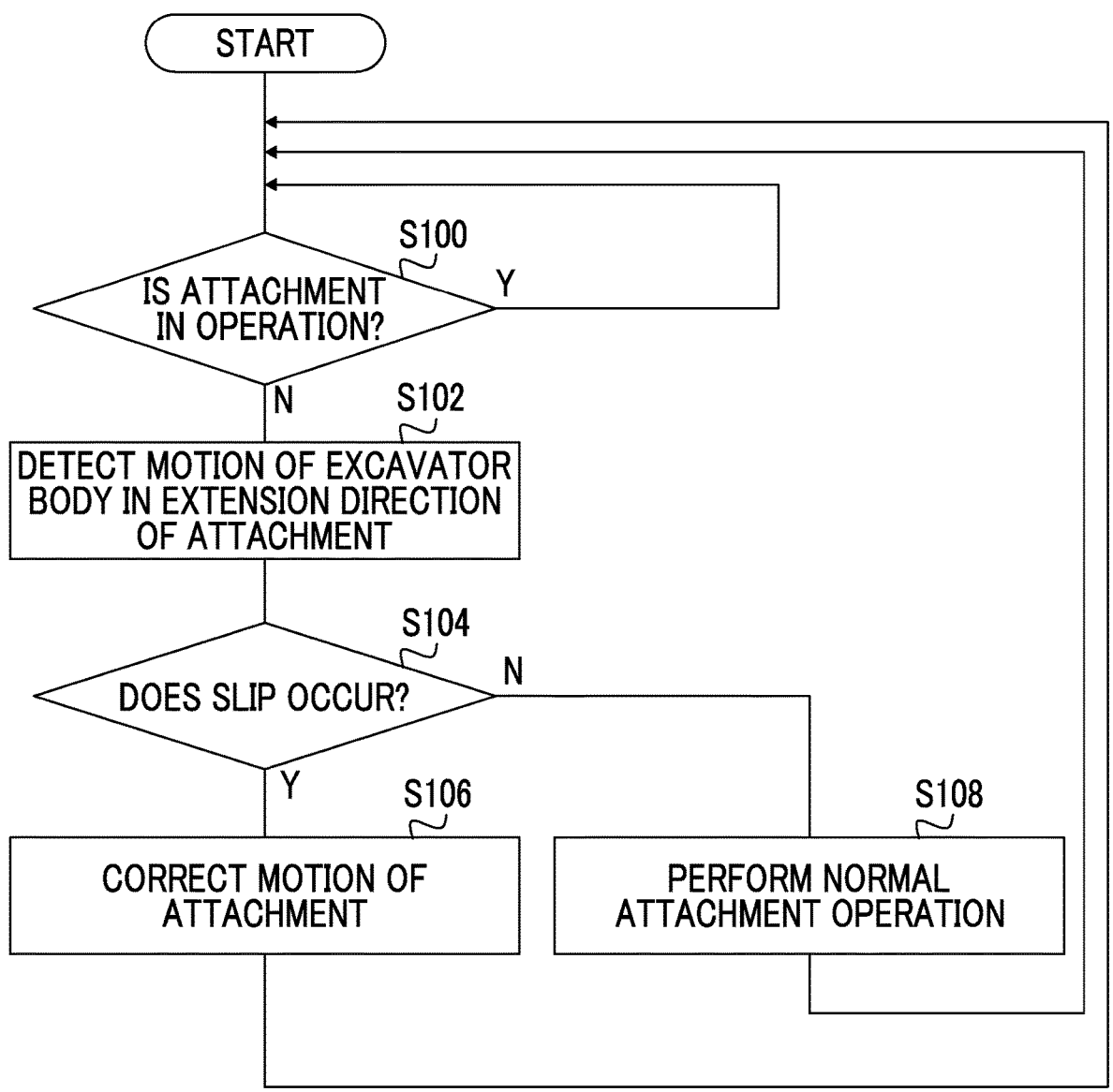
FIG. 5 is a flow chart of a slip correction according to the embodiment.

FIG. 5 is a flow chart of a slip correction according to the embodiment. First, it is determined whether or not the attachment is operated (S100). If the attachment is not operated (N in S100), the step returns to Step S100. If the operation of the attachment 12 is detected (Y in S100), the motion (for example, acceleration) of the excavator body in the extension direction L1 of the attachment is detected (S102). In addition, when the slip is not detected (N in S104), a normal operation of the attachment (S108) is performed based on the input of the operator. In a case where the slip is detected (Y in S104), the operation of the attachment 12 is corrected (S106).

According to the excavator 1 of the embodiment, the slip caused by the operation of the attachment 12 is detected by the sensor 504, the operation of the attachment 12 is corrected by the result of the detection, and thus, the slip can be suppressed.

A cause of a displacement of the traveling body 2 is not only the slip caused by the excavation reaction force of the attachment but also an intentional displacement by the traveling body, the slip caused by turning of the turning body, or the like. However, when the operation correction of the attachment is most effective is a case where the slip is caused by the excavation reaction force, and the slip and the displacement caused by other factors may increase the slip and the displacement. More specifically, during the excavation work by the attachment, in a case where the traveling body is displaced, the operation of the attachment 12 may be corrected.

Actually, when it is detected that the vehicle body slips, in order to distinguish the slip caused by the excavation and the slip caused by other factors, the slip suppression unit 510 may include a function of determining whether or not the operation is the excavation operation. The slip suppression unit 510 may determine an excavation state based on detection information relating to the position of the boom, the arm, and the bucket. Each of the positions of the boom, the arm, and the bucket can be detected by an angle sensor or a stroke sensor. Manipulation information of a manipulation lever of the attachment, the turning, and the traveling can be used instead of the position information. In a case where the turning and the traveling are manipulated, it can be determined that slip is not the slip caused by the excavation. Whether or not the excavation is under way may be determined based on pressure information of the cylinder included in the attachment.

Basically, the excavation work by the attachment is performed in a state where the traveling is stopped or a state where the turning is stopped. During the excavation work, the operator simultaneously manipulates two levers so as to manipulate at least two actuators included in the attachment such as the boom and the arm, the arm and the bucket, or the boom and the bucket. Accordingly, the manipulation lever of the attachment being in a manipulation state and the traveling body and the upper turning body being in a non-manipulation state can be necessary conditions of the excavation work performed by the attachment.

Therefore, in a case where the state can be determined as a traveling state and the turning state, even when the slip occurs, it is determined that the slip is not slip caused by the attachment, and this determination can be used for determination materials of the control. Conversely, when earth and sand are excavated by the attachment, if it is determined that the slip is slip caused by the operation of the attachment further considering determination conditions that the state is not the traveling state and the turning state, it is possible to accurately suppress the slip caused by the excavation operation.

Therefore, according to embodiments described in the present specification, if the position of the traveling body is displaced during the excavation of the attachment, the operation of the attachment is corrected, and the slip is suppressed. Moreover, in this case, as determination materials of the correction, by correcting the operation of the attachment further considering the manipulation information or actual operations of the manipulation lever of the attachment, the traveling body, and the turning, it is possible to accurately suppress the slip caused by the excavation operation.

As shown in FIGS. 4A, 4B, 4C and 4D, the extension direction L1 of the attachment 12 always coincides with the direction (front surface direction) of the upper turning body 4. Accordingly, by mounting the sensor 504 (acceleration sensor) on the upper turning body 4, not on the traveling body 2 side on which the slip actually occurs, it is possible to directly and correctly detect a slip motion in the extension direction L1 without depending on a turning angle (position) of the upper turning body 4.

By correcting the operation of the attachment 12 at a high speed, it is theoretically possible for the operator to suppress the slip without being aware of the correction. However, if a response delay increases, there is a possibility that the operator may feel a divergence between his/her own manipulation and the operation of attachment 12. Therefore, when the slip is detected in the excavator 1, the operator may be informed or warned that the slip occurs in parallel with the correction of the operation of attachment 12. As a result, the operator can recognize that the deviation between the manipulation and the operation occurs due to an automatic correction of the operation of the attachment 12. In addition, in a case where this notification occurs consecutively, the operator can recognize that his/her own operation is inappropriate, and the manipulation is supported.

The present invention extends to various devices and methods which are ascertained as the block diagram of FIG. 2 or derived from the above descriptions and is not limited to specific configurations. Hereinafter, in order to assist or clarify the essence of the invention or understanding of a circuit operation rather than narrowing the scope of the present invention, a more specific configuration example will be explained.

Figure 6A:
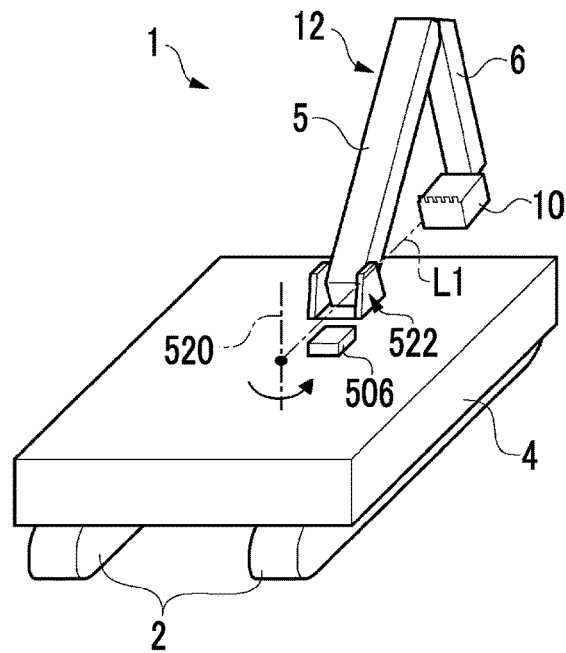
FIGS. 6A and 6B are diagrams explaining an example of an attachment location of a sensor.
Figure 6B:
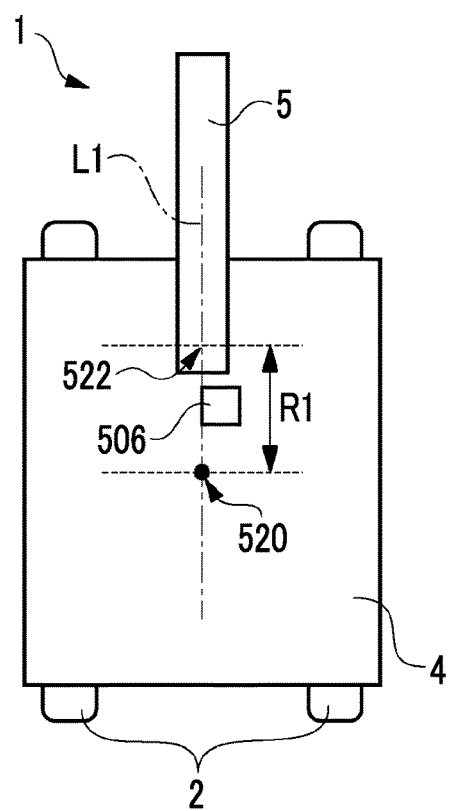

FIGS. 6A and 6B are diagrams explaining an example of an attachment location of the sensor 504. As described above, the sensor 504 includes an acceleration sensor 506 which is provided on the upper turning body 4. The acceleration sensor 506 includes a detection shaft in the extension direction L1. Here, an application point of a force which is exerted to the upper turning body 4 by the attachment 12 is a root 522 of the boom 5. Accordingly, it is preferable that the acceleration sensor 506 is provided at the root 522 of the boom 5. Therefore, it is possible to appropriately detect the slip caused by the operation of the attachment 12.

Here, if the acceleration sensor 506 is away from a turning axis 520, when the upper turning body 4 is turned, the acceleration sensor 506 is affected by a centrifugal force caused by the turning. Accordingly, it is preferable that the acceleration sensor 506 is positioned in the vicinity of the root 522 of the boom 5 and is disposed in the vicinity of the turning axis 520. In summary, it is preferable that the acceleration sensor 506 is disposed in a region R1 between the root 522 of the boom 5 and the turning axis 520 of the upper turning body 4. Accordingly, it is possible to decrease the influences of the turning included in the output of the acceleration sensor 506, and it is possible to appropriately detect slip caused by the operation of the attachment 12.

In addition, if the position of the acceleration sensor 506 is too far from the ground, the output of the acceleration sensor 506 includes an acceleration component caused by pitching or rolling, which is not preferable. From this point of view, it is preferable to install the acceleration sensor 506 as far below the upper turning body 4 as possible.

Continuously, the correction control of the attachment 12 will be described. The correction control of the attachment 12 is roughly classified into two methods. Hereinafter, each of the methods will be described.

First Correction Method

In a first correction method, if the slip is detected, the slip suppression unit 510 decreases a torque (force) of at least one of movable shafts (links) of the attachment 12. Considering various works, the arm shaft is preferable as a shaft of a controlled object, and accordingly, it is desirable that the slip suppression unit 510 decreases the force of the arm cylinder 8 in order to suppress the slip.

Figure 7:
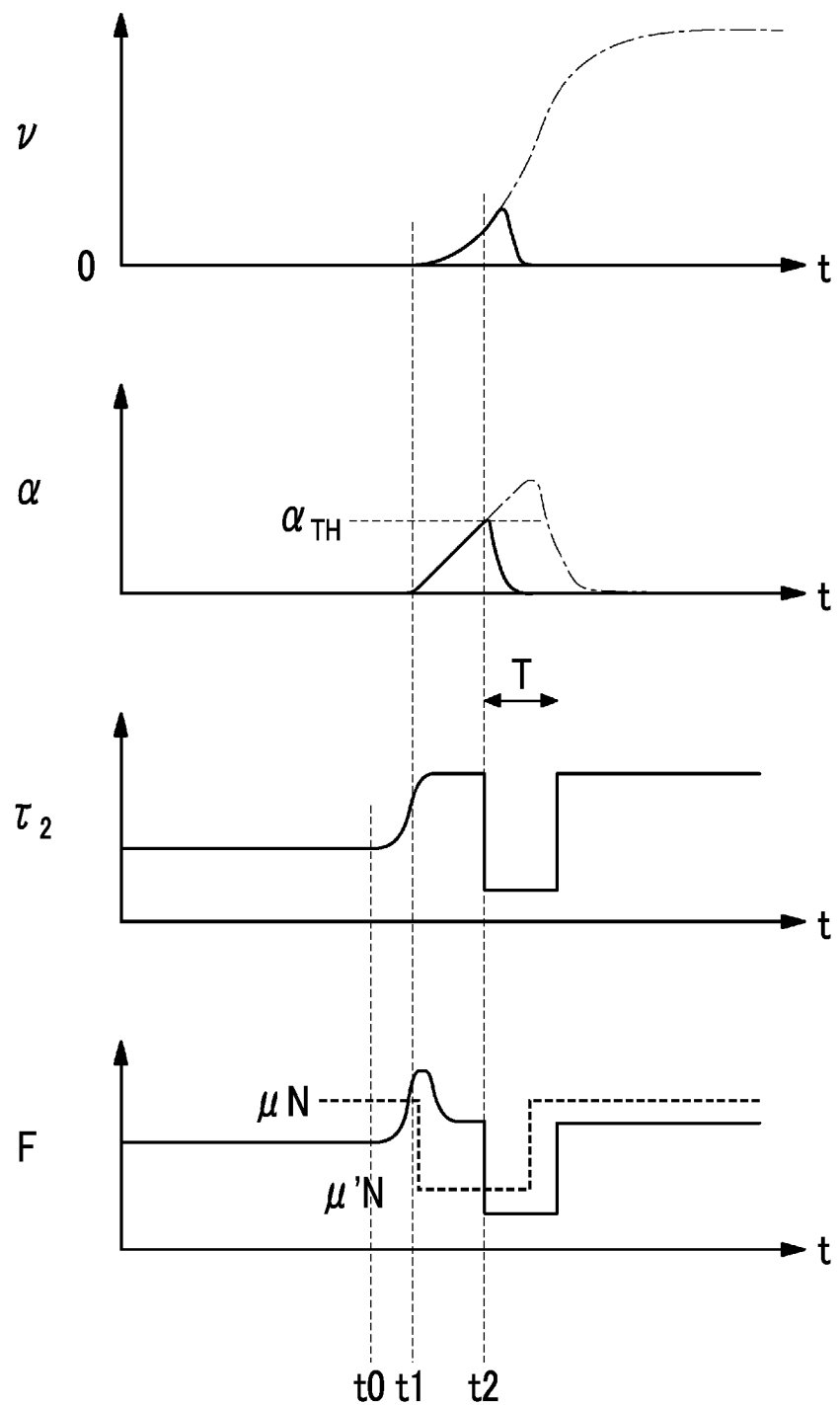
FIG. 7 is a waveform diagram showing slip prevention according to a first correction method.

FIG. 7 is a waveform diagram showing slip prevention according to the first correction method. In FIG. 7, from the top, a speed v and an acceleration α in the extension direction L1 of the traveling body 2, a torque τ (for example, a torque $τ_2$ of the arm shaft) generated in the attachment 12, and a force F which is exerted to the body of the excavator 1 by the operation of the attachment 12 in the extension direction L1 are shown in this order. For ease of understanding and simplification of explanation, FIG. 7 schematically shows the operation of excavator 1. In FIG. 7, for comparison, a waveform when the correction control is not performed is indicated by dash-dotted lines.

First, an operation in a case where the correction control is not performed will be described. Before a time t0, the slip does not occur, the traveling body 2 is stationary with respect to the ground, and the speed v is zero. At the time t0, if the manipulation lever is further inclined by the operator, the torque τ2 (or torques τ1 and τ3 of other shafts) increases. Accordingly, the force F in the extension direction L1 applied to the body of the excavator 1 increases, and the force exceeds the maximum static friction force μN at a time t1. Therefore, the traveling body 2 starts to slip on the ground and the speed v increases as shown by the dash-dotted lines.

Continuously, an operation when the first correction method is adopted will be described. If the traveling body 2 starts to slip at the time t1, the acceleration α starts to increase. In order words, the slip of the traveling body 2 occurs according to the increase of the acceleration α, and thus, the slip suppression unit 510 determines the slip based on the acceleration α detected by the acceleration sensor 506. For example, if the acceleration α detected by the acceleration sensor 506 exceeds a predetermined threshold αTH, the slip suppression unit 510 determines that the slip occurs and causes the correction control to be effective.

If the acceleration α exceeds the threshold αTH at a time t2, the correction control is effective. In the first correction method, the correction control is effective during a correction period T, and in the correction period T, the torque τ2 of the arm shaft decreases regardless of the manipulation input of the operator. If the torque τ2 decreases, the force F which is exerted to the body of the excavator 1 by the attachment 12 decreases. If the force F is lower than a dynamic friction force μ' F, the slip decreases. In addition, after the correction period T elapses, the correction is released, the torque is returned to the original torque τ2 before the correction, based on the input of the operator. The correction period T may be 1 millisecond to 2 seconds, and from simulation results taken by the present inventors, more preferably, the correction period T is approximately 10 ms to 200 ms. After the correction is released, the force F increases to the original level. However, the traveling body 2 is stationary with respect to the ground, and thus, a stationary state of the traveling body 2 is maintained and the traveling body 2 does not slip as long as the force F does not exceed the maximum static friction force μN.

For example, in the excavation work of FIG. 3A, if the arm 6 is stretched in a state where a large amount of earth and sand is loaded on the bucket 10, the force F is generated, and thus, the traveling body 2 starts to slip forward. Therefore, the slip suppression unit 510 instantly decreases a retraction force (torque τ2) of the arm 6. Accordingly, the force F decreases and is lower than the dynamic friction force μ'N, and thus, the slip is stopped. After the slip is stopped, the correction is released, and thus, the torque τ2 of the arm 6 is returned to the original torque. At this case, the maximum static friction force μN (>μ'N) is effective, and thus, the slip does not occur. By repeating this processing at a very short time scale, the operator can suppress the slip without changing a manipulated variable of the lever and without impairing a manipulation feeling.

Second Correction Method

A second correction method described below may be used together with the first correction method or may be used alone. In the second correction method, if the slip is detected, the slip suppression unit 510 displaces at least one shaft of the attachment 12 to finely adjust a posture of the attachment 12.

Figure 8:
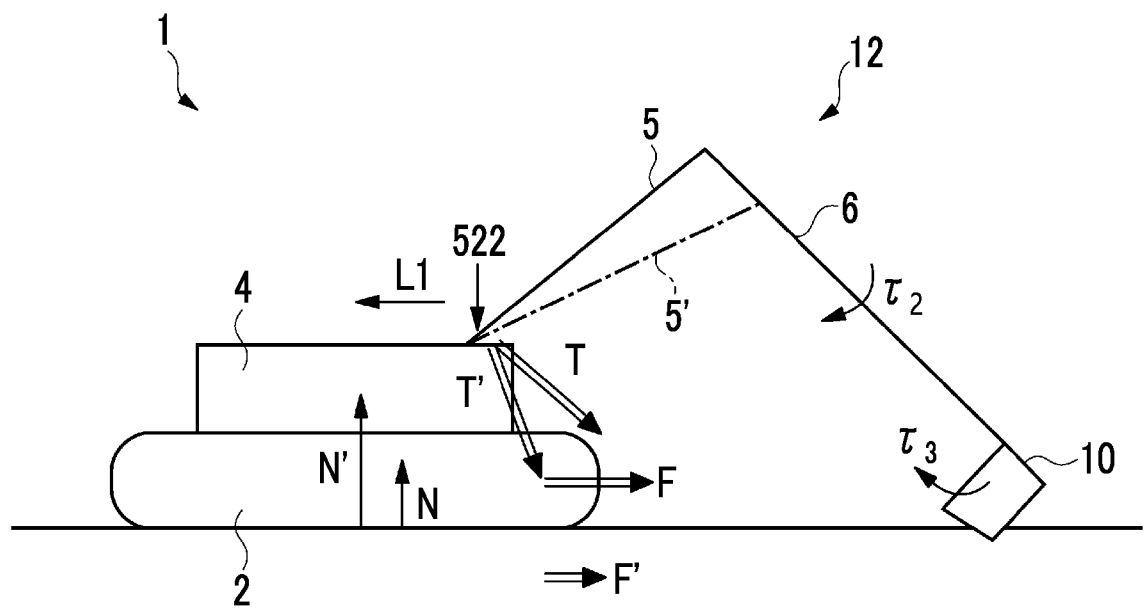
FIG. 8 is a diagram explaining a second correction method.

FIG. 8 is a diagram showing the second correction method. In FIG. 8 shows the excavator 1 during the excavation work when viewed from the side. A state of the attachment 12 before the correction is indicated by a solid line and a state of the attachment 12 after the correction is indicated by a dash-dotted line. For example, a large amount of earth and sand is loaded on the bucket 10, and the excavator 1 draws the bucket 10 in this state. Accordingly, a torque T having the root 522 of the boom as the application point is generated about the bucket 10. A component of the torque T parallel to the ground acts as the force F by which the traveling body 2 slips.

If the posture of the attachment 12 is changed by the correction, a direction of the torque (force) acting on the root 522 is changed from T to T'. For example, in FIG. 8, a position of the boom is corrected from 5 indicated by a solid line to 5' indicated by a dash-dotted line. A component (a force by which the traveling body 2 slips) F' of the torque T' after the correction parallel to the ground is smaller than the force F before the correction. Accordingly, the slip is suppressed.

In addition to this, if the direction of the torque is changed from T to T', a component perpendicular to the ground, that is, a force pressing the traveling body 2 to the ground increases. Accordingly, a vertical drag N increases compared to that before the correction, the dynamic friction force μ'N increase, and the slip is suppressed.

In the example of FIG. 8, the slip is suppressed by two effects obtained by decreasing the force F and increasing the vertical drag N. However, in the second correction method, an aspect which uses only one of the two effects is effective. Hereinbefore, the correction method is described.

Continuously, a more detailed configuration of the excavator 1 will be described. FIGS. 9 to 13 are block diagrams showing electric systems and hydraulic systems of the excavator 1 according to a first example to a fifth example of the embodiment. In addition, in FIGS. 9 to 13, a system which mechanically transmits power is indicated by a double line, a hydraulic system is indicated by a thick solid line, a steering system is indicated by a broken line, and an electric system is indicated by a thin solid line. Moreover, here, a hydraulic excavator is described. However, the present invention can be applied to a hybrid excavator which uses a motor to perform the turning.

First, a configuration common to FIGS. 9 to 13 will be described. An engine 11 which is a mechanical drive section is connected to a main pump 14 and a pilot pump 15 which are a hydraulic pump. A control valve 17 is connected to the main pump 14 via a high-pressure hydraulic line 16. In addition, two hydraulic circuits for supplying a hydraulic pressure to a hydraulic actuator may be provided, and in this case, the main pump 14 includes two hydraulic pumps. In the present specification, for easy understanding, a case where the main pump is one system will be described.

The control valve 17 is a device for controlling a hydraulic system in the excavator 1. The boom cylinder 7, the arm cylinder 8, and the bucket cylinder 9 in addition to traveling hydraulic motors 2A and 2B for driving the traveling body 2 shown in FIG. 1 are connected to control valve 17 via a high-pressure hydraulic line, and the control valve 17 controls hydraulic pressures (control pressures) supplied to these according to the manipulation input of the operator.

In addition, a turning hydraulic motor 21 for driving the turning device 3 is connected to the control valve 17. The turning hydraulic motor 21 is connected to the control valve 17 via a hydraulic circuit of a turning controller. However, in FIG. 3, the hydraulic circuit of the turning controller is not shown for simplification.

The manipulation device 26 (manipulating means) is connected to the pilot pump 15 via a pilot line 25. The manipulation device 26 is manipulating means for manipulating the traveling body 2, the turning device 3, the boom 5, the arm 6, and the bucket 10, and is manipulated by the operator. The control valve 17 is connected to the manipulation device 26 via a hydraulic line 27 and a pressure sensor 29 is connected to the manipulation device 26 via a hydraulic line 28.

For example, the manipulation device 26 includes hydraulic pilot type manipulation levers 26A to 26D. The manipulation levers 26A to 26D are levers which respectively correspond to the boom shaft, the arm shaft, the bucket shaft, and the turning axis. Actually, two manipulation levers are provided, two shafts are allocated to a vertical direction and a horizontal direction of the one manipulation lever, and remaining two shafts are allocated to a vertical direction and a horizontal direction of the remaining manipulation lever. Moreover, the manipulation device 26 includes a pedal (not shown) for controlling the traveling shaft.

The manipulation device 26 converts a hydraulic pressure (primary hydraulic pressure) supplied through the pilot line 25 into a hydraulic pressure (secondary hydraulic pressure) corresponding to the manipulated variable of the operator and outputs the converted pressure. The secondary hydraulic pressure (control pressure) output from the manipulation device 26 is supplied to the control valve 17 through the hydraulic line 27 and is detected by the pressure sensor 29. That is, the detection value of the pressure sensor 29 indicates a manipulation input $\theta_{CNT}$ of the operator with respect to each of the manipulation levers 26A to 26D. Moreover, in FIGS. 9 to 11, one hydraulic line 27 is shown. However, actually, the hydraulic line of the control command value is present in each of a left traveling hydraulic motor, a right traveling hydraulic motor, and the turning.

The controller 30 is a main controller which performs a drive control of the excavator. The controller 30 is configured of a calculation processing device including a Central Processing Unit (CPU) and an internal memory and is realized by the CPU executing a drive control program stored in the memory. The slip suppression unit 510 of FIG. 2 can be configured of a functional program of the controller 30.

The sensor 504 detects the motion (for example, acceleration) of the body of the excavator 1 in the extension direction of the attachment 12 and supplies a detection signal S2 corresponding to the motion to the controller 30.

For example, the main pump 14, the pilot pump 15, the control valve 17, or the like in FIGS. 9 to 13 corresponds to the drive means 502 in FIG. 2.

Figure 9:
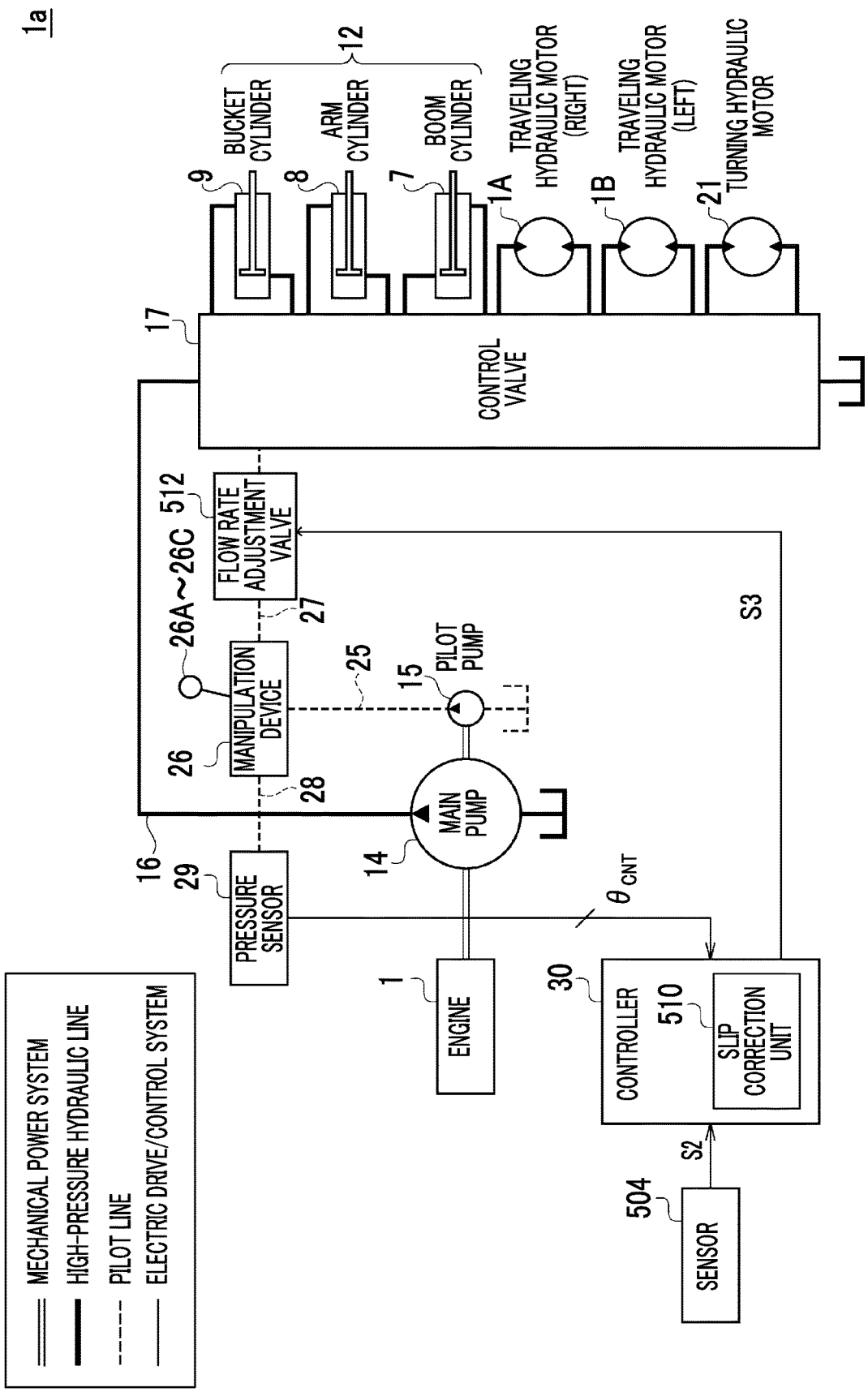
FIG. 9 is a block diagram of an electric system and a hydraulic system of an excavator according to a first example.
Figure 10:
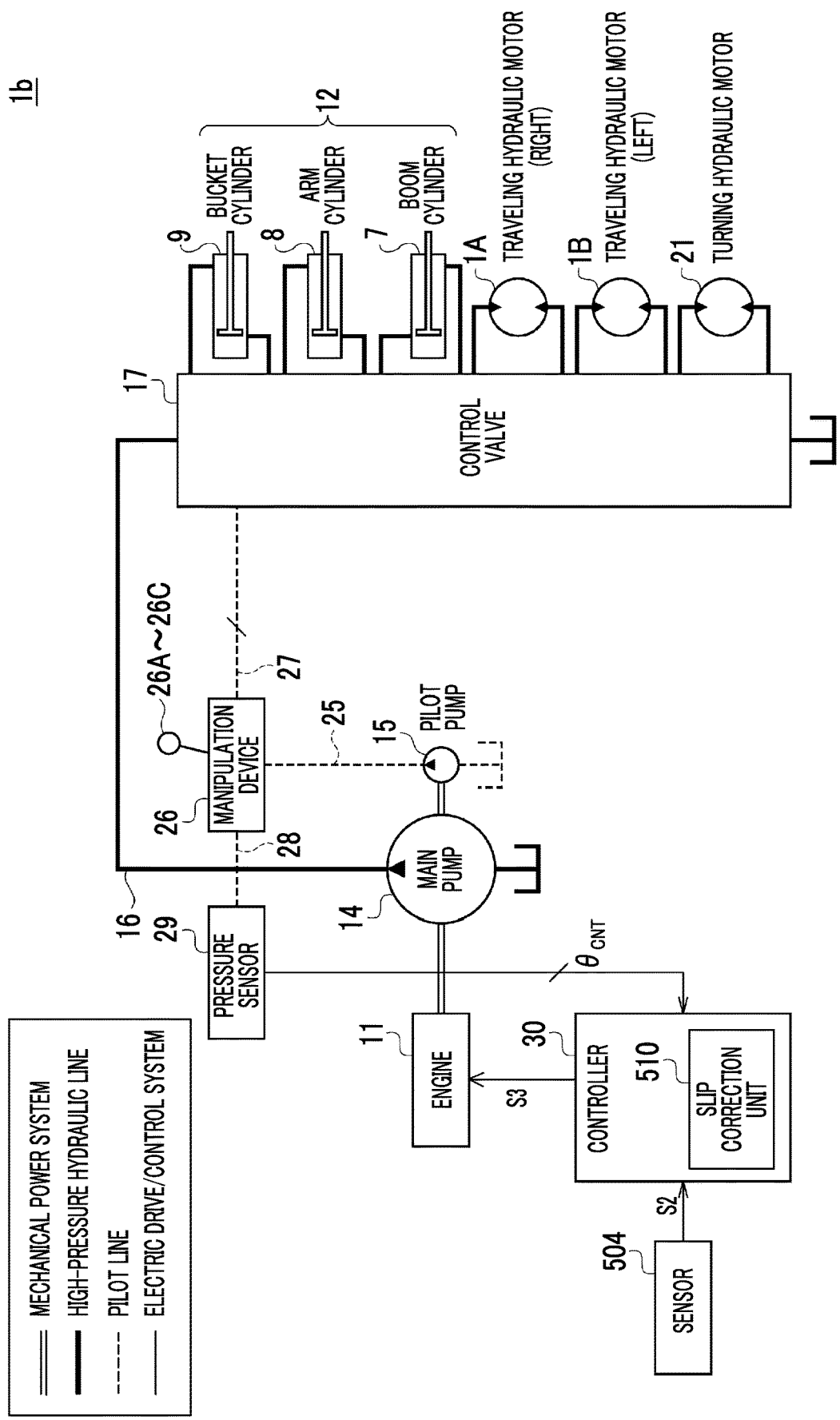
FIG. 10 is a block diagram of an electric system and a hydraulic system of an excavator according to a second example.
Figure 11:
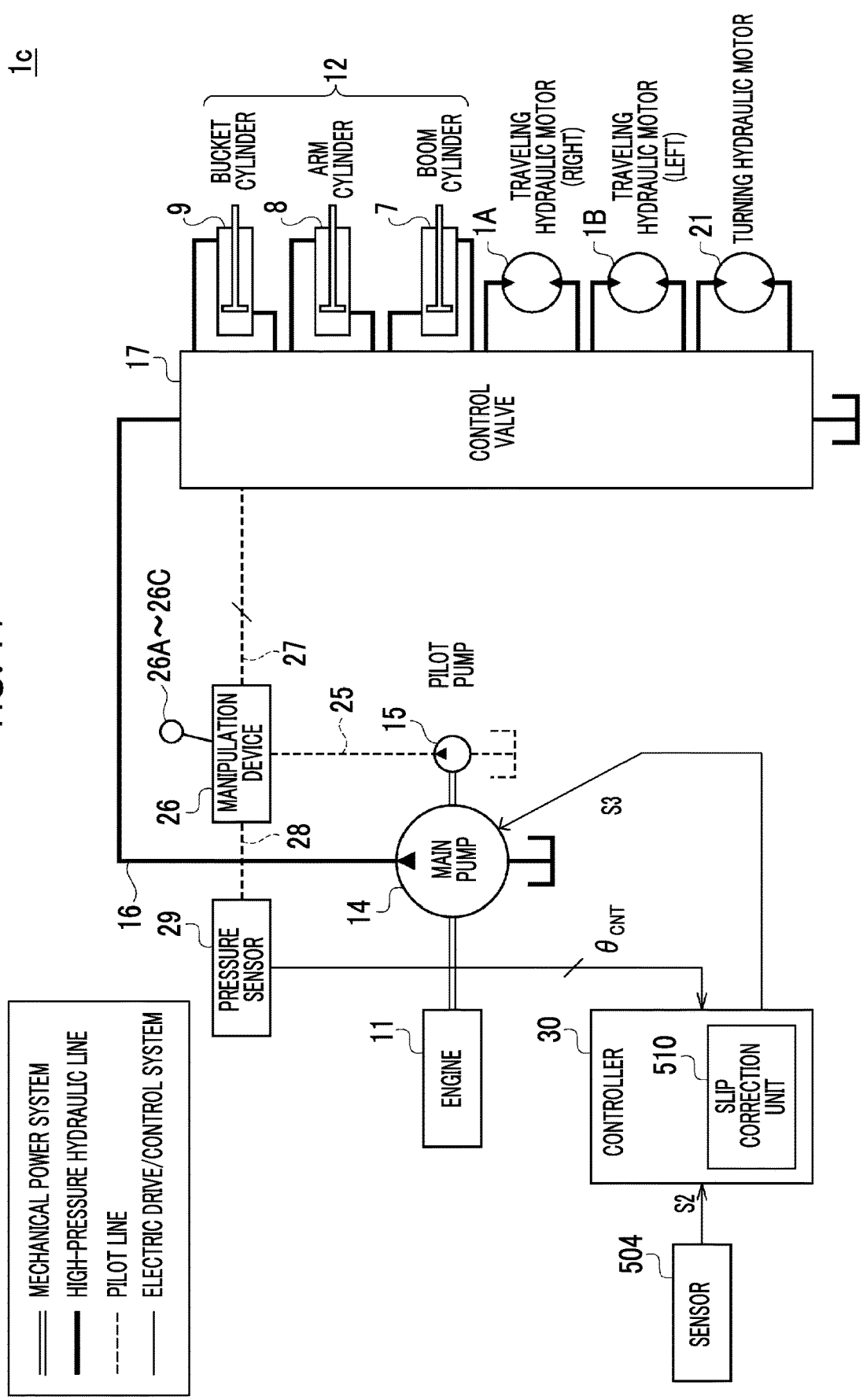
FIG. 11 is a block diagram of an electric system and a hydraulic system of an excavator according to a third example.

The slip suppression unit 510 of the controller 30 corrects the operation of the attachment 12 in order to suppress the slip. In FIGS. 9 to 11, different configuration examples for controlling the motion of the attachment 12 by the first correction method are described.

FIG. 9 shows an excavator 1a according to the first example. In the excavator 1a, the torque is decreased by changing a control pressure of at least one shaft of an object to be corrected to a cylinder. Specifically, the excavator 1a in FIG. 9 further includes a flow rate adjustment valve 512, which is provided on the hydraulic line 27 corresponding to the shaft of the object to be corrected, in order to correct the attachment 12. For example, in a case where the correction in which the arm shaft is the object to be corrected is performed, the flow rate adjustment valve 512 is provided on the hydraulic line 27 of the arm shaft. The controller 30 controls the flow rate adjustment valve 512 so as to decrease the control pressure of the arm cylinder 8 and decrease the torque (force) of the arm shaft. The flow rate adjustment valve 512 can ascertain a portion of the slip suppression unit 510 of FIG. 2.

FIG. 10 shows an excavator 1b according to the second example. In the excavator 1b, the slip suppression unit 510 of the controller 30 decreases the torque of the attachment 12 by decreasing a rotation speed of the engine 11 to suppress the slip. In this case, the shaft of the object to be controlled cannot be selected, and the torques (forces) of the boom shaft, the arm shaft, and the bucket shaft are uniformly decreased.

FIG. 11 is an excavator 1c according to the third example. In the excavator 1c, the slip suppression unit 510 of the controller 30 decreases the torque of the attachment 12 by decreasing the output of the main pump 14 so as to suppress the slip. In this configuration, the torques (forces) of the boom shaft, the arm shaft, and the bucket shaft are uniformly decreased.

Figure 12:
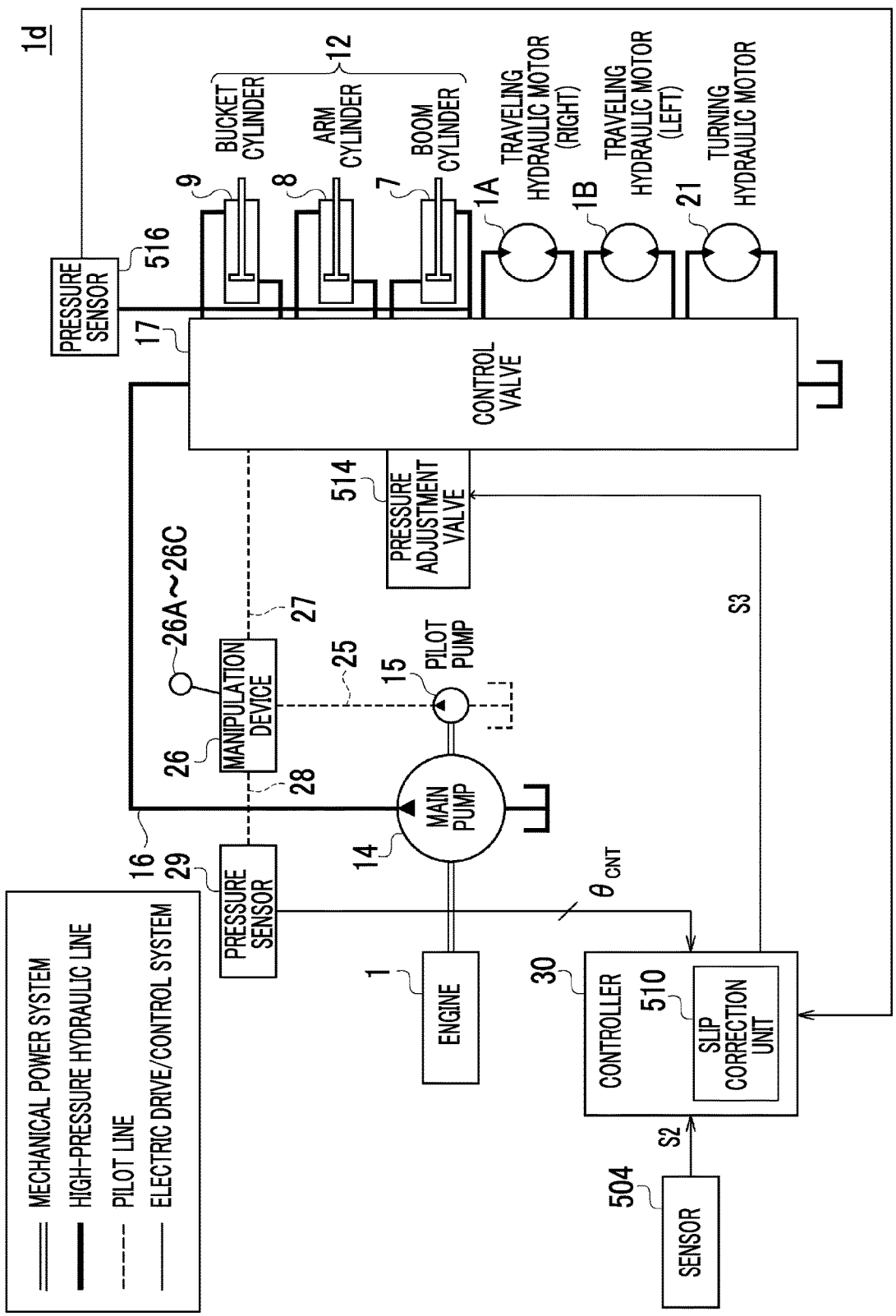
FIG. 12 is a block diagram of an electric system and a hydraulic system of an excavator according to a fourth example.

FIG. 12 is an excavator 1d according to the fourth example. A pressure adjustment valve (relief valve) 514 is attached to the control valve 17. If the slip is detected, the slip suppression unit 510 relieves a cylinder pressure of the shaft of the object to be controlled using the pressure adjustment valve 514. Accordingly, the torque of the shaft decreases and the slip can be suppressed. The pressure adjustment valve 514 can ascertain a portion of the slip suppression unit 510 in FIG. 2. This configuration has an advantage that the configuration is easy to be mounted in addition to obtaining an effect comparable to other configurations.

For example, the pressure sensor 516 monitors a cylinder pressure of each shaft of the boom cylinder 7, the arm cylinder 8, and the bucket cylinder 9. The pressure adjustment valve 514 is configured to independently relieve a cylinder pressure of each shaft of the boom cylinder 7, the arm cylinder 8, and the bucket cylinder 9 according to a correction command S3 from the controller 30. A detection value of the cylinder pressure is supplied to the controller 30. If the slip is detected, the slip suppression unit 510 may relieve the pressure of the shaft, in which an excessive cylinder pressure is detected, using the pressure adjustment valve 514. That is, the shaft in which the excessive cylinder pressure occurs becomes the shaft of the object to be controlled.

In a case where a specific shaft (for example, the arm shaft) is the object to be controlled, the pressure adjustment valve 514 may be provided such that the cylinder pressure of the shaft can be relieved.

Figure 13:
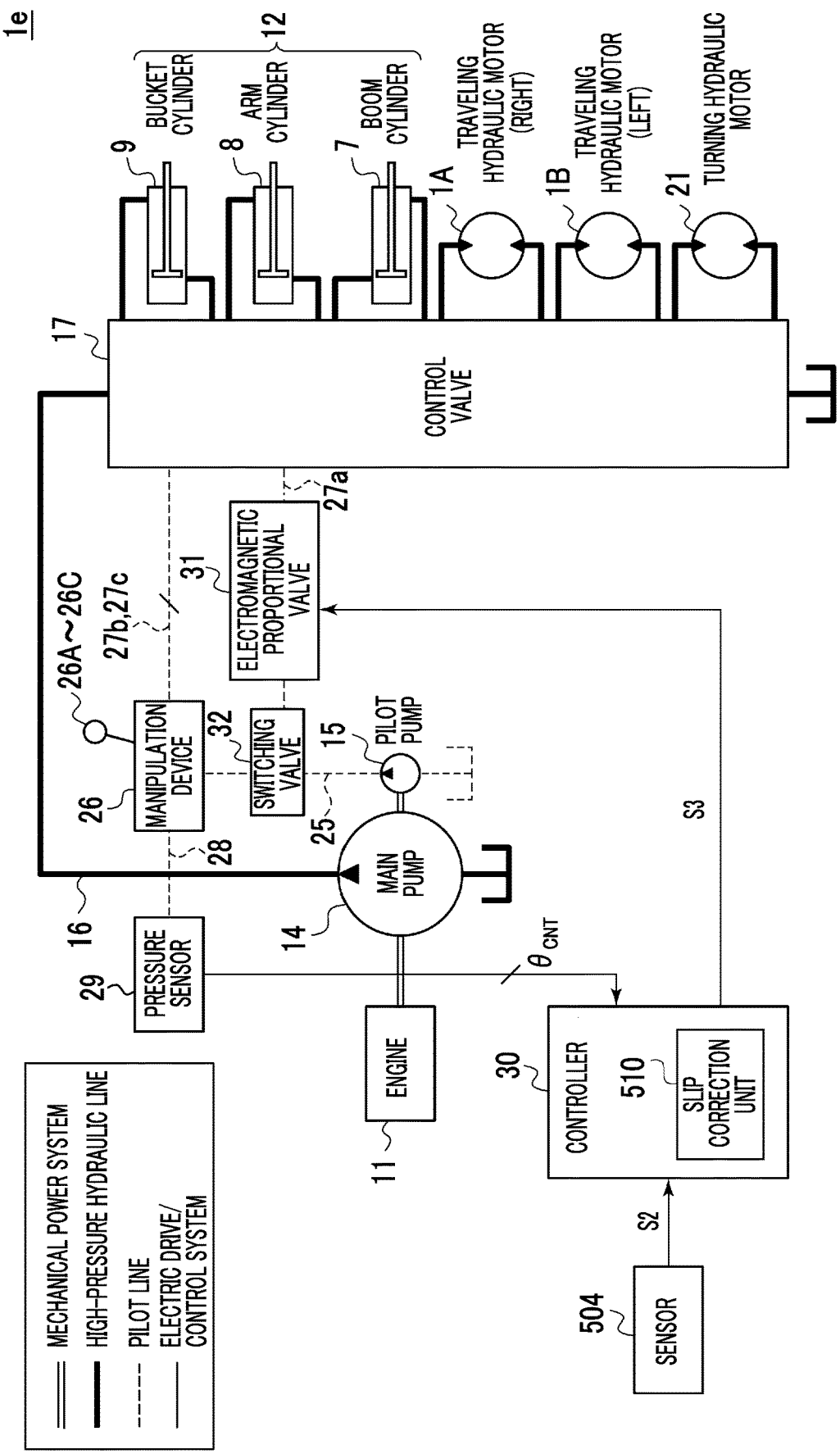
FIG. 13 is a block diagram of an electric system and a hydraulic system of an excavator according to a fifth example.

FIG. 13 shows an excavator 1e according to the fifth example. The excavator 1e controls the motion of the attachment 12 by the second correction method. The excavator 1e includes an electromagnetic control valve 31. Here, a case where the boom shaft is the object to be corrected in the second correction method and a posture thereof is controlled is exemplified. Similarly to the excavator in the related art, the arm shaft and the bucket shaft of uncontrolled objects are controlled by control pressures of the hydraulic lines 27b and 27c changed by inclinations of the manipulation levers 26B and 26C.

Meanwhile, the cylinder 7 of the boom shaft which is the object to be corrected is controlled by the electromagnetic control valve 31. A switching valve (or simply branch) 32 branches the pilot line 25 into the electromagnetic control valve 31. The hydraulic pressure of the hydraulic line 27a of the electromagnetic control valve 31 is used to control the boom cylinder 7. The pressure sensor 29 detects the manipulation input $\theta_{CNT}$ to the boom shaft and outputs the manipulation input $\theta_{CNT}$ to the controller 30. In addition, during a normal operation (other than a correction period), the controller 30 controls the electromagnetic control valve 31 based on the manipulation input $\theta_{CNT}$. During the correction period to prevent the slip, the slip suppression unit 510 of the controller 30 controls the electromagnetic control valve 31 so as to obtain a posture after the correction.

In addition, it should be noted that the configuration of the excavator 1 shown in FIGS. 9 to 13 is an example, and it is understood by those skilled in the art that necessary correction processing can be performed by other configurations.

Hereinbefore, the embodiments of the present invention are described. It is understood by those skilled in the art that the present invention is not limited to the above embodiments, various design changes are possible, various modification examples are possible, and the modification examples are within the scope of the present invention. Hereinafter, the modification examples will be described.

First Modification Example

The sensor 504 may include a speed sensor which detects the speed of the main body of the excavator 1 in the extension direction of the attachment 12. In addition, if the detected speed exceeds a threshold, the correction may be effective.

Second Modification Example

The sensor 504 may further include an angular speed sensor which detects an angular speed. The slip suppression unit 510 may correct the output of the acceleration sensor 506 based on the output of the angular speed sensor. The output of the acceleration sensor 506 may include components of rotary motions in a pitching direction, a yawing direction, and a rolling direction as well as slip (rectilinear motion) in a specific direction. According to this modification example, by using the angular speed sensor in combination, it is possible to extract only the slip motion by excluding the influences of the rotary motion.

Third Modification Example

The sensor 504 is provided in the upper turning body 4. However, the sensor 504 may be provided in the traveling body 2. In this case, by detecting the turning angle (position) of the upper turning body 4, the motion in the extension direction of the attachment 12 is detected from the output of the sensor 504, and the slip in the direction can be detected.

Fourth Modification Example

If the sensor 504 can directly detect the slip of the traveling body 5, the sensor is not limited to the acceleration sensor or the speed sensor, and other sensors may be used. For example, the sensor 504 may be an image sensor, and the slip suppression unit 510 may detect the slip of the traveling body in the extension direction of the attachment by image analysis processing.

The present invention is described using specific words and phrases with reference to specific embodiments. However, it is to be understood that the embodiments are merely illustrative of the principles and applications of the present invention and many modifications and arrangements can be made within a scope which does not depart from the spirit of the present invention defined in claims.

The present invention can be used in an industrial machine.

It should be understood that the invention is not limited to the above-described embodiment, but may be modified into various forms on the basis of the spirit of the invention. Additionally, the modifications are included in the scope of the invention.

What is claimed is:

1. An excavator, comprising:
   an undercarriage;
   a rotating platform rotatably provided on the undercarriage;
   an attachment being attached to the rotating platform;
   a turning hydraulic motor for driving the rotating platform;
   an actuator for driving the attachment; and
   a sensor for detecting motion of the excavator, wherein the sensor is adaptive to detect the slip of the undercarriage when the actuator operates; and
   a slip suppression unit for, based on output from the sensor, suppressing the slip of the undercarriage.

2. The excavator according to claim 1, wherein the sensor is adaptive to detect the undercarriage being dragged, and the slip suppression unit is adaptive to suppress the slip of the undercarriage based on the output from the sensor.

3. The excavator according to claim 1, wherein the slip suppression unit is adaptive to suppress the slip of the undercarriage when the undercarriage is displaced during an excavation work by the attachment.

4. The excavator according to claim 1, wherein the slip suppression unit is adaptive to suppress the slip of the undercarriage when the undercarriage is displaced toward a first direction extending to the position of the attachment or a second direction which is an inverse direction of the first direction.

5. A method of controlling an excavator having an actuator for driving an attachment and a turning hydraulic motor, the method comprising:
   a sensor detecting the slip of an undercarriage when the actuator operates; and
   a step of suppressing the slip of the undercarriage based on an output from the sensor.

6. An excavator, comprising:
   an undercarriage;
   a rotating platform rotatably provided on the undercarriage;
   an attachment attached to the rotating platform;
   a turning hydraulic motor for driving the rotating platform;
   an actuator for driving the attachment; and
   a sensor for detecting motion of the excavator during excavation work performed by the actuator driving the attachment; and
   a control device configured to detect a displacement of the undercarriage during the excavation work performed by the actuator driving the attachment based on an output of the sensor and to suppress slip of the undercarriage.

* * * * *